United States Patent [19]
Escallier

[11] Patent Number: 5,886,889
[45] Date of Patent: Mar. 23, 1999

[54] DEVICE AND METHOD FOR DIRECT CURRENT POWER SUPPLY TO A TRACTION SYSTEM BY MEANS OF CONVERTERS FROM DIFFERENT ALTERNATING CURRENT OR DIRECT CURRENT VOLTAGES

[75] Inventor: Didier Escallier, Semeac, France

[73] Assignee: GEC Alsthom Transport SA, Paris, France

[21] Appl. No.: 921,011

[22] Filed: Aug. 29, 1997

[30] Foreign Application Priority Data

Sep. 3, 1996 [FR] France .................................. 96 10713

[51] Int. Cl.$^6$ .............................. H02M 7/217; H02P 1/54
[52] U.S. Cl. ............................................... 363/69; 318/107
[58] Field of Search ................................. 363/65, 67, 69, 363/70, 84, 89; 318/107, 49, 55

[56] References Cited

U.S. PATENT DOCUMENTS

| | | | |
|---|---|---|---|
| 5,267,137 | 11/1993 | Goebel | 363/87 |
| 5,398,182 | 3/1995 | Crosby | 363/89 |
| 5,460,244 | 10/1995 | Tanahashi | 187/293 |
| 5,576,940 | 11/1996 | Steigerwald et al. | 363/17 |
| 5,629,591 | 5/1997 | Thevenon | 318/107 |

FOREIGN PATENT DOCUMENTS

| | | |
|---|---|---|
| 0698519A1 | 2/1996 | European Pat. Off. . |
| 2713565A1 | 6/1995 | France . |
| 19524985A1 | 8/1996 | Germany . |

*Primary Examiner*—Adolf Deneke Berhane
*Attorney, Agent, or Firm*—Sughrue, Mion, Zinn, Macpeak & Seas, PLLC

[57] ABSTRACT

A device and a method are disclosed for direct current voltage power supply to a traction system by means of converters from different alternating current or direct current voltages available on a power supply line. The power supply device is supplied with power by means of a first power supply element and a second power supply element connected to the power supply line. In this supply device the first power supply element is connected to the primary winding of the power supply transformer by a first connection element. The second power supply element is connected either to the power supply terminal of the traction system or to the mid-point of the series converters by a second connection element.

10 Claims, 4 Drawing Sheets

DEVICE AND METHOD FOR DIRECT CURRENT POWER SUPPLY TO A TRACTION SYSTEM BY MEANS OF CONVERTERS FROM DIFFERENT ALTERNATING CURRENT OR DIRECT CURRENT VOLTAGES

BACKGROUND OF THE INVENTION

1. Field of the Invention

The present invention concerns traction systems, especially in the railroad art, in general, and applies, more particularly, to a device and a method for direct current power supply to a traction system by means of converters from different alternating current or direct current voltages.

2. Description of the Prior Art

U.S. Pat. No. 5,629,591 concerns a high-availability multicurrent power supply system for railroad locomotives.

The above patent shows that traction systems using asynchronous motors, for example, require a direct current power supply.

The above patent also indicates that railroad vehicles are increasingly designed to travel on networks with different power supply voltages in different areas.

Voltages of 25 kV, 50 Hz, 15 kV, 16 ⅔ Hz, 3 kV DC or 1.5 kV DC are found, for example.

Prior art devices for direct current power supply to a traction system by means of converters from different alternating current or direct current voltages use a dedicated converter for each power supply voltage.

In other words, prior art devices for direct current power supply to a traction system by means of converters from different alternating current or direct current voltages use, for example:

a Graëtz bridge or a single-phase bridge with forced switching for alternating current power supplies, a reducer device, for example a chopper, if the DC power supply voltage is higher than the power supply voltage of the traction system, a booster device if the DC power supply voltage is less than the power supply voltage of the traction system.

One aim of the invention is a device and a method for direct current power supply to a traction system by means of converters from different alternating current or direct current voltages enabling the same converters to be used.

SUMMARY OF THE INVENTION

The device and the method in accordance with the invention for direct current power supply to a traction system by means of converters from different alternating current or direct current voltages are as characterized hereinafter.

One advantage of the device and the method of the invention for direct current power supply to a traction system by means of converters from different alternating current or direct current voltages is that it reduces the equipment to be installed in the traction system because the converters are re-used according to the various voltages available.

It follows from the foregoing that none of the converters remains out of use, as is the case in the prior art devices.

Another advantage of the device and the method of the invention for direct current power supply to a traction system by means of converters from different alternating current or direct current voltages is that they reduce the number of contactors, especially in the case of a 1500 V power supply.

Another advantage of the device and the method of the invention for direct current power supply to a traction system by means of converters from different alternating current or direct current voltages is that they eliminate inductors.

Another advantage of the device and the method of the invention for direct current power supply to a traction system by means of converters from different alternating current or direct current voltages is that the output for supplying power to the traction system is always at the same terminal.

Other aims, features and advantages of the invention will emerge from a reading of the description of the preferred embodiment of the device and the method for direct current power supply to a traction system by means of converters from different alternating current or direct current voltages given with reference to the drawings.

DETAILED DESCRIPTION OF THE PREFERRED EMBODIMENTS

Figure 1:
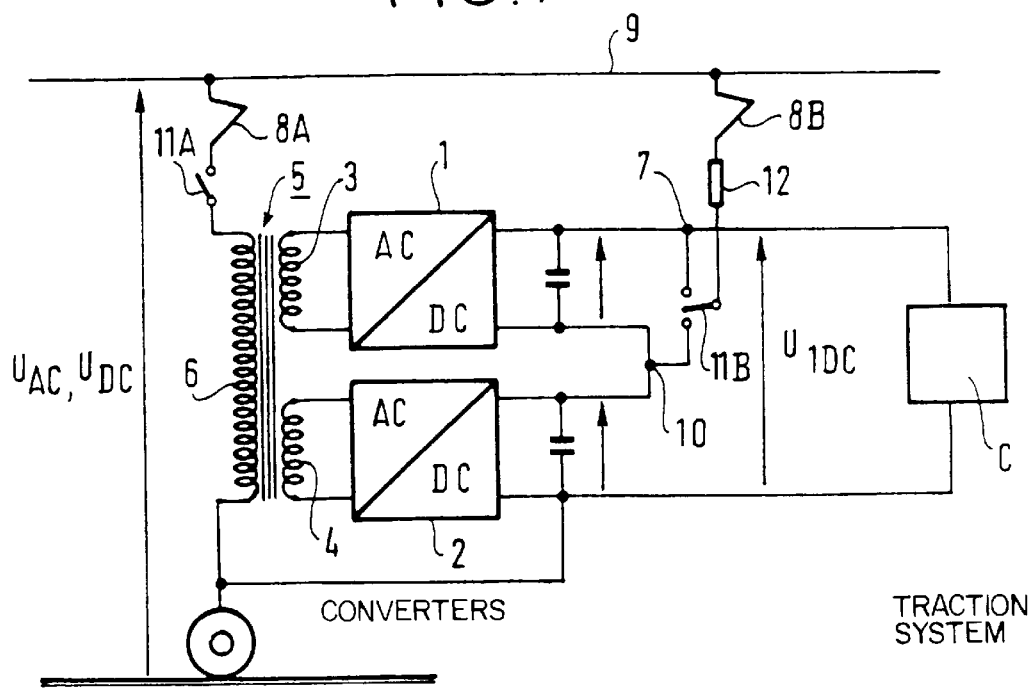
FIG. 1 is a schematic representation of the device and the method of the invention for direct current power supply to a traction system by means of converters from different alternating current or direct current voltages.

FIG. 1 is a schematic representation of a device in accordance with the invention for supplying power at a direct current voltage $U_{1DC}$ to a traction system C by means of converters 1, 2 from different alternating current or direct current voltages $U_{AC}$, $U_{DC}$.

The various alternating current or direct current voltages $U_{AC}$, $U_{DC}$ are available on a power supply line 9.

The alternating current/direct current converters 1, 2 are connected in series so as to have a mid-point 10.

The AC sides of the alternating current/direct current converters 1, 2 are respectively connected to first and second secondary windings 3 and 4 of a power supply transformer 5 having a primary winding 6.

The DC sides of the alternating current/direct current converters 1, 2 supply the direct current power supply voltage $U_{1DC}$ at a power supply terminal 7 of the traction system C.

The traction system C includes, in the manner known in the prior art, at least one traction motor (not shown) and converters (not shown) for adjusting the operating point of the traction motors, the power supply voltage $U_{1DC}$ being a direct current voltage.

The power supply device of the traction system C is supplied with power from a first power supply element 8A and a second power supply element 8B connected to the power supply line 9.

In accordance with one essential feature of the invention, the power supply device of the traction system C is such that the first power supply element 8A can be connected, on the one hand, to the primary winding 6 of the power supply transformer 5 by means of a first connection element 11A and the second power supply element 8B can be connected, on the other hand, either to the supply terminal 7 of the traction system C or to the mid-point 10 of the series converters 1, 2 by means of a second connection element 11B.

The converters 1, 2 are of the single-phase bridge type with forced switching.

The power supply transformer 5 and the converters 1, 2 are therefore capable of providing a DC power supply to a traction system from the following power supply voltages:

any alternating current voltage $U_{AC}$, a direct current voltage $U_{1DC}$ equal to the power supply voltage of the traction system, a direct current voltage $U_{2DC}$ in the order of half the power supply voltage of the traction system.

As described in more detail hereinafter, an inverter function and a rectifier function can be assigned to the converters 1, 2 according to whether the traction system is operating in braking mode or in traction mode.

These functions are assigned by means of the first and second connecting elements (11A, 11B).

Figure 2:
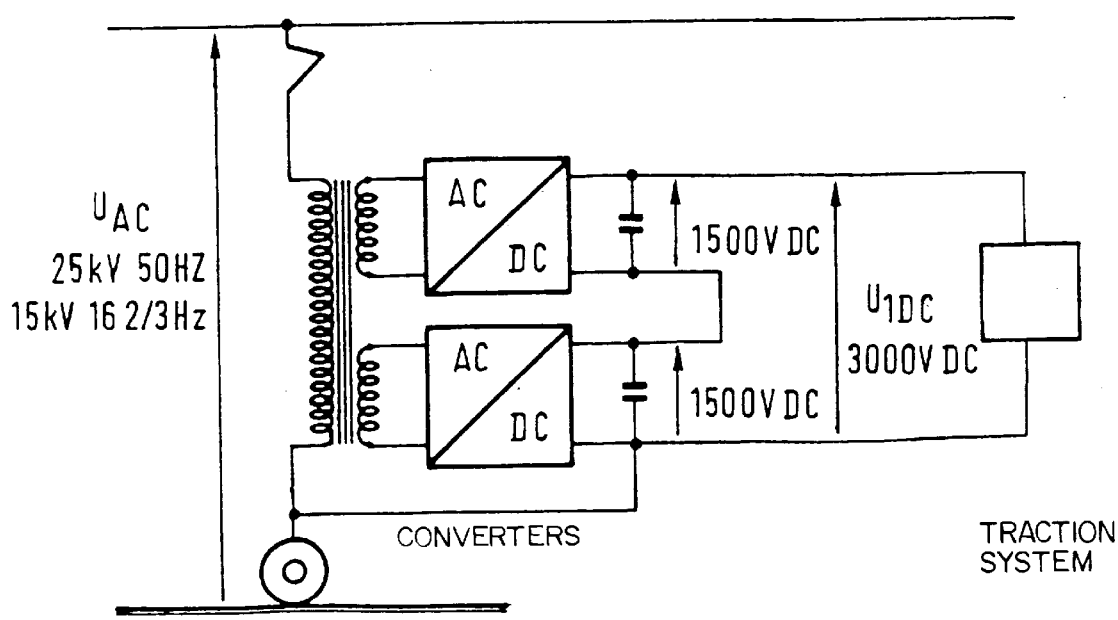
FIG. 2 is a schematic representation of the power supply device of the invention from FIG. 1 in the situation in which the power supply voltage available is an alternating current voltage $U_{AC}$.

FIG. 2 is a schematic representation of the power supply device of the invention from FIG. 1 in the situation in which the power supply voltage available is an alternating current voltage $U_{AC}$.

The power supply device of the traction system is supplied with power by means of the first power supply element 8A connected, on the one hand, to the power supply line 9 and, on the other hand, to the primary winding 6 of the power supply transformer 5.

Both converters 1, 2 connected in series supply power to the traction system C at a voltage $U_{1DC}$.

Each converter 1, 2 has at its output terminals only a voltage in the order of $U_{1DC}/2$.

The available power supply voltage $U_{AC}$ is equal to 25 kV, 50 Hz or to 15 kV, 16 ⅔ Hz, for example.

Figure 3:
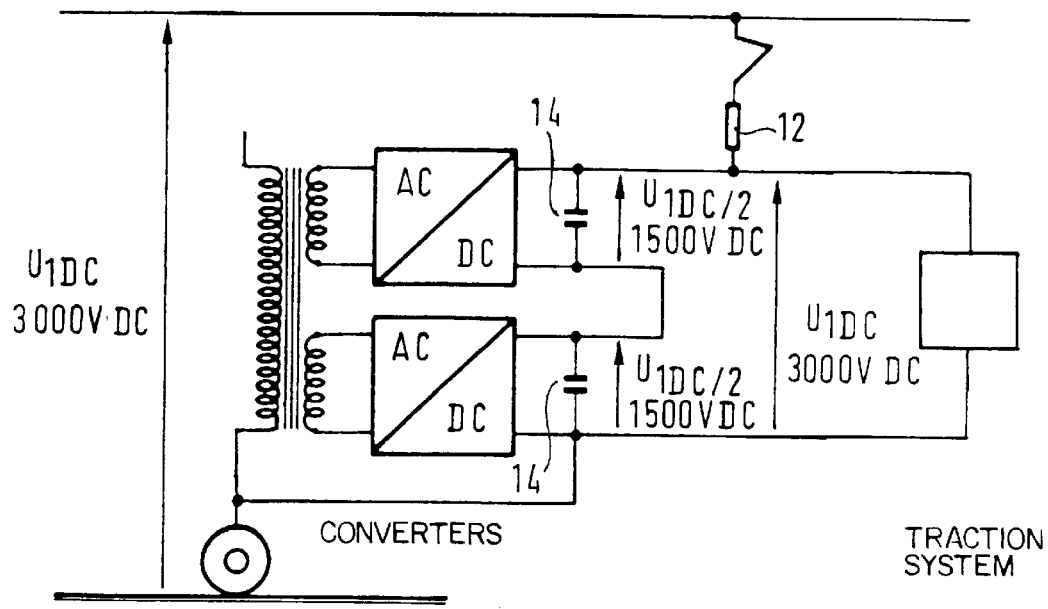
FIG. 3 is a schematic representation of the power supply device of the invention from FIG. 1 in the situation in which the power supply voltage available is a direct current voltage $U_{1DC}$ equal to the power supply voltage of the traction system.

FIG. 3 is a schematic representation of the power supply device of the invention from FIG. 1 in the situation in which the power supply voltage available is a direct current voltage $U_{1DC}$ equal to the power supply voltage of the traction system.

The power supply device of the traction system C is supplied with power by means of the second power supply element 8B connected, on the one hand, to the power supply line 9 and, on the other hand, to the power supply terminal 7 of the traction system.

The traction system C is preferably supplied with power through a filter device 12, for example of the inductor and capacitor type.

In the present instance the power supply transformer 5 and the converters 1, 2 do not have any function.

Here, one advantage of the device and the method of the invention for direct current power supply to a traction system by means of converters from different alternating current or direct current voltages is that the capacitors 14 associated with the converters can be used for all or part of the filter device 12.

The direct current voltage $U_{1DC}$ is equal to 3 000 V DC, for example.

Figure 4:
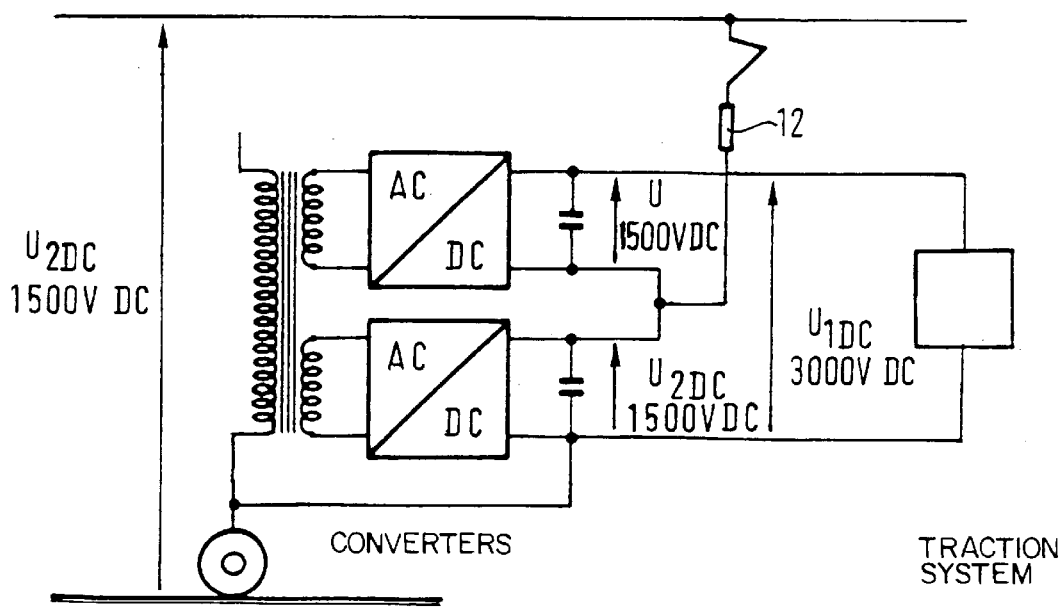
FIG. 4 is a schematic representation of the power supply device of the invention from FIG. 1 in the situation in which the power supply voltage available is a direct current voltage $U_{2DC}$ in the order of half the power supply voltage of the traction system.

FIG. 4 is a schematic representation of the power supply device of the invention from FIG. 1 in the situation in which the power supply voltage available is a direct current voltage $U_{2DC}$ in the order of half the power supply voltage of the traction system.

The power supply device of the traction system C is supplied with power by means of the second power supply element 8B connected, on the one hand, to the power supply line 9 and, on the other hand, to the mid-point 10 of the series converters 1, 2.

The power supply device is therefore supplied with power at the mid-point 10 of the series converters 1, 2.

In a configuration of the above kind, one converter 2 operates as an inverter and supplies power to the power supply transformer 5 via the secondary winding 4 associated with the converter 2.

The second converter 1 operates as a rectifier and uses the power supplied by the converter 2 to maintain at its output terminals a voltage U such that:

$$U = U_{1DC} - U_{2DC}$$

The inverter and rectifier functions are assigned to the converters 1, 2 according to whether the traction system is operating in braking mode or in traction mode.

The direct current voltage $U_{2DC}$ is equal to 1 500 V DC, for example.

Figure 5:
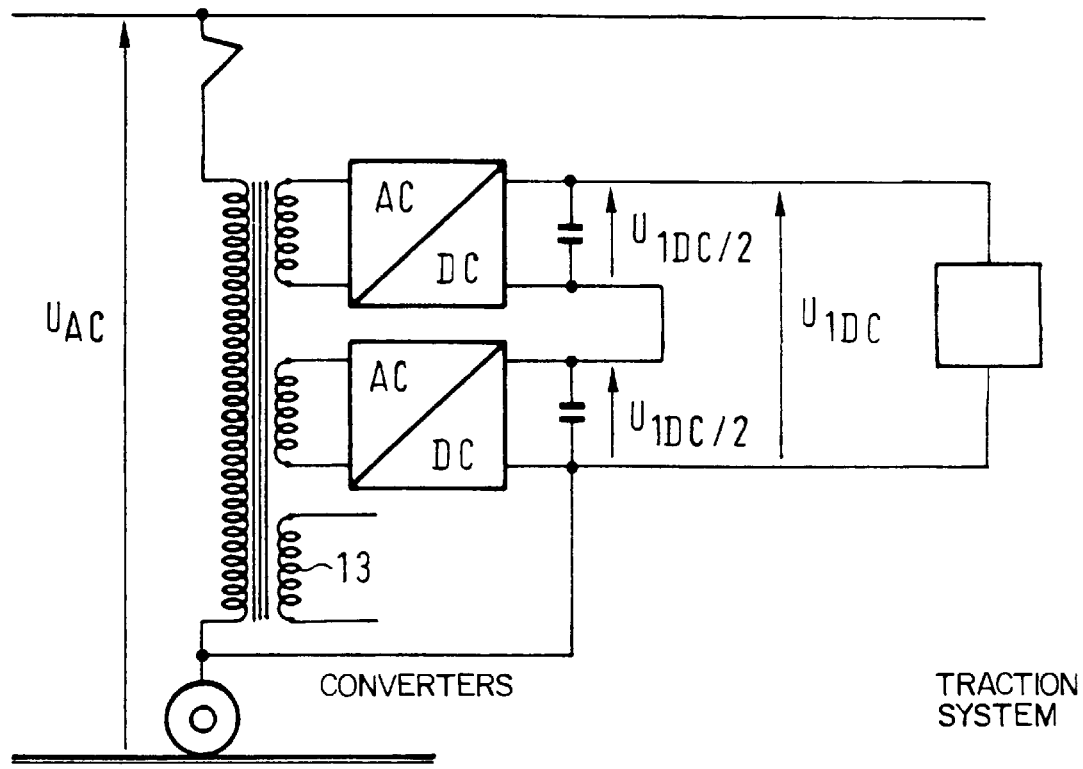
FIGS. 5 through 7 are schematic representations of other embodiments of the device and the method of the invention for direct current power supply to a traction system by means of converters from different alternating current or direct current voltages.
Figure 6:
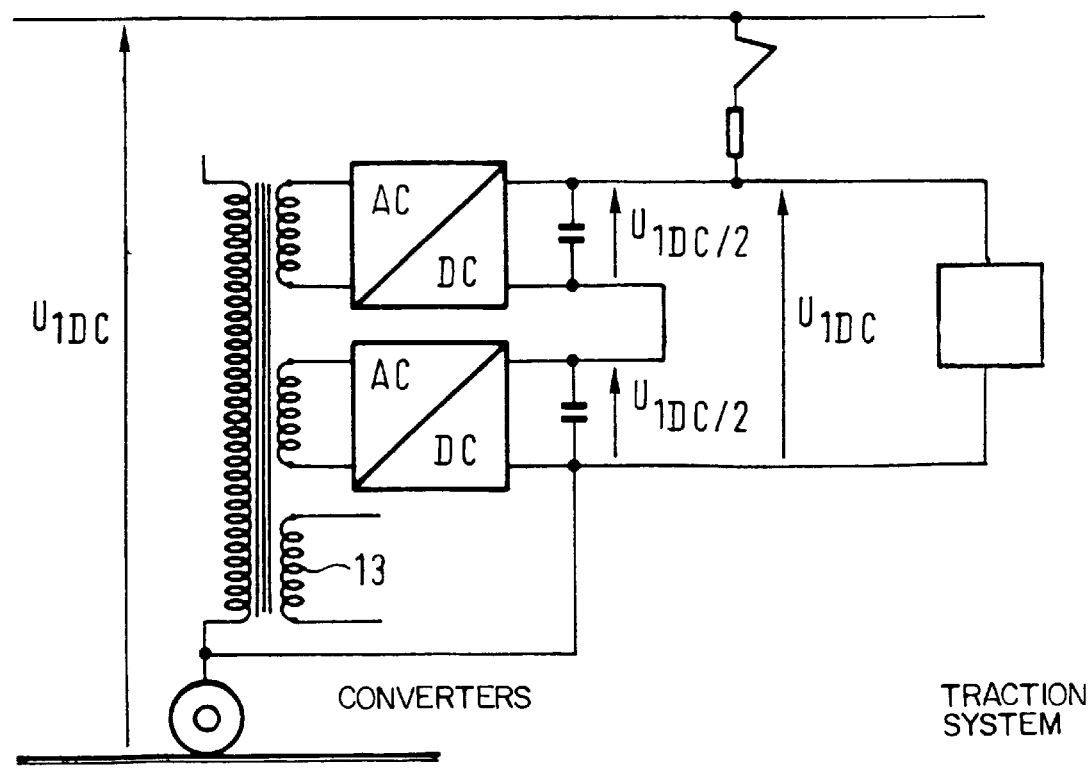
Figure 7:
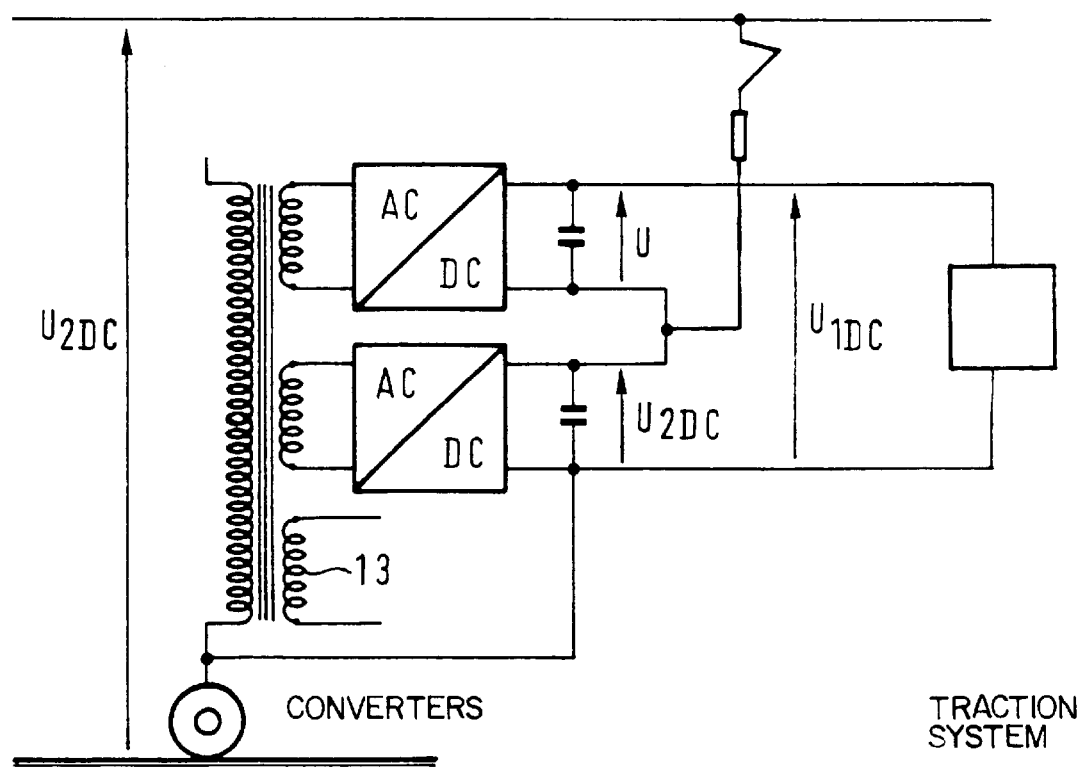

FIGS. 5 through 7 are schematic representations of other embodiments of the device and the method of the invention for direct current power supply to a traction system by means of converters from different alternating current or direct current voltages.

In such embodiments, the power supply transformer has an additional winding 13.

This additional winding 13 of the power supply transformer 5 supplies power to another circuit, for example the auxiliaries of the traction system.

FIG. 5 is a schematic representation of the power supply device of the invention in the situation in which the supply voltage available is an alternating current voltage $U_{AC}$.

This embodiment corresponds to the conventional operation of a transformer with a plurality of secondary windings.

FIG. 6 is a schematic representation of the power supply device of the invention in the situation in which the power supply voltage available is a direct current voltage $U_{1DC}$ equal to the power supply voltage of the traction system.

In this other embodiment, the converters 1, 2 operate as an inverter or as a rectifier and supply power to the additional winding 13 of the power supply transformer 5 by magnetic coupling.

FIG. 7 is a diagrammatic representation of the power supply device of the invention in the situation in which the power supply voltage available is a direct current voltage $U_{2DC}$ in the order of half the power supply voltage of the traction system.

In this other embodiment, one of the converters operates as an inverter, some of the energy being used by the additional winding 13 of the power supply transformer 5.

The result of the foregoing is a method of supplying power at a direct current voltage $U_{1DC}$ to a traction system C by means of converters 1, 2 from different direct current or alternating current voltages $U_{AC}$, $U_{DC}$ available on a power supply line 9.

The alternating current/direct current converters 1, 2 are disposed in series so as to have a mid-point 10.

The alternating current AC sides of the alternating current/direct current converters 1, 2 are respectively connected to a first secondary winding and a second secondary winding 4 of a power supply transformer 5 having a primary winding 6.

The direct current DC sides of the alternating current/direct current converters 1, 2 supply the direct current power supply voltage $U_{1DC}$ at a power supply terminal 7 of the traction system C.

The power supply device of said traction system C is supplied with power by means of a first power supply element 8A and a second power supply element 8B connected to said power supply line 9.

The method of supplying power to the traction system C includes a step of connecting the first power supply element 8A to the primary winding 6 of the power supply transformer 5 by means of a first connection element 11A if said power supply voltage available on said power supply line 9 is an alternating current voltage $U_{AC}$ or connecting the second power supply element 8B via a second connection element 11B either to the power supply terminal 7 of the traction system C if the power supply voltage available on said power supply line 9 is a direct current voltage $U_{1DC}$ equal to the power supply voltage of the traction system C or to the mid-point 10 of the series converters 1, 2 if the power supply voltage available on the power supply line 9 is a direct current voltage $U_{2DC}$ in the order of half the power supply voltage of the traction system C.

There is claimed:

1. A device for direct current voltage power supply to a traction system by means of converters from different types of voltages available on a power supply line, alternating current sides of said converters being respectively connected to a first secondary winding and to a second secondary winding of a power supply transformer having a primary winding, direct current sides of said converters supplying said direct current power supply voltage at a power supply terminal of said traction system, said power supply device of said traction system being supplied with power by means of a first power supply element and a second power supply element connected, on the one hand, to said power supply line, said first power supply element being adapted to be connected, on the other hand, to said primary winding of said power supply transformer by means of a first connection element and said second power supply element being adapted to be connected, on the other hand, to said power supply terminal of said traction system, in which power supply device of said traction system said converters are disposed in series so as to have a mid-point and said second power supply element is also adapted to be connected, on the other hand, to said mid-point of said series converters by means of a second connection element.

2. A device as claimed in claim 1 wherein power is supplied at a direct current voltage to said traction system from a direct current voltage in the order of half the power supply voltage of said traction system.

3. A device as claimed in claim 1 wherein power is supplied at a direct current voltage to said traction system from any alternating current voltage.

4. A device as claimed in claim 1 wherein power is supplied at a direct current voltage to said traction system from a direct current voltage equal to the power supply voltage of said traction system.

5. A device as claimed in claim 3 wherein said traction system is supplied with power via a filter device.

6. A device as claimed in claim 4 wherein said traction system is supplied with power via a filter device.

7. The device claimed in claim 3 wherein said filter device includes capacitors, all or some of said capacitors being capacitors associated with said converters.

8. The device claimed in claim 1 wherein said power supply transformer has an additional winding.

9. The device claimed in claim 1 wherein said converters are of the single-phase bridge type with forced switching.

10. A method for direct current voltage power supply to a traction system by means of converters from different voltages available on a power supply line, alternating current sides of said converters being respectively connected to a first secondary winding and to a second secondary winding of a power supply transformer having a primary winding, direct current sides of said converters supplying said direct current power supply voltage at a power supply terminal of said traction system, said power supply device of said traction system being supplied with power by means of a first power supply element and a second power supply element connected, on the one hand, to said power supply line, said method including a step of connecting said first power supply element, on the other hand, to said primary winding of said power supply transformer by means of a first connection element if said power supply voltage available on said power supply line is an alternating current voltage or connecting said second power supply element by means of a second connection element, on the other hand, to said power supply terminal of said traction system if said power supply voltage available on said power supply line is a direct current voltage equal to the power supply voltage of said traction system, in which method of supplying power to said traction system said converters are disposed in series so as to have a mid-point and said method including a step of connecting said second power supply element by means of said second connection element to said mid-point of said series converters if said power supply voltage available on said power supply line is a direct current voltage in the order of half the power supply voltage of said traction system.

* * * * *